United States Patent
Schäfer et al.

(10) Patent No.: US 6,766,366 B1
(45) Date of Patent: Jul. 20, 2004

(54) METHOD FOR LOADING A FUNCTION PROVIDED BY A FIRST COMPUTER (SERVER) ONTO A SECOND COMPUTER (CLIENT)

(75) Inventors: Ralf Schäfer, Dornhan (DE); Martin Gitsels, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/485,326
(22) PCT Filed: Aug. 6, 1998
(86) PCT No.: PCT/DE98/02265
§ 371 (c)(1), (2), (4) Date: Feb. 7, 2000
(87) PCT Pub. No.: WO99/08419
PCT Pub. Date: Feb. 18, 1999

(30) Foreign Application Priority Data

Aug. 7, 1997 (DE) .......................................... 197 34 229

(51) Int. Cl.⁷ .............................................. G06F 15/173
(52) U.S. Cl. ........................ 709/223; 709/203; 709/231; 709/232; 717/171; 717/172; 717/176; 717/177
(58) Field of Search ................................ 709/203, 232, 709/231, 247, 223; 717/171, 172, 176, 177

(56) References Cited

U.S. PATENT DOCUMENTS

| | | | |
|---|---|---|---|
| 4,724,521 A | | 2/1988 | Carron et al. |
| 5,544,320 A | | 8/1996 | Konrad |
| 5,901,228 A | * | 5/1999 | Crawford ..................... 705/34 |
| 5,923,885 A | * | 7/1999 | Johnson et al. ............. 717/176 |
| 5,925,123 A | * | 7/1999 | Tremblay et al. ........... 712/212 |
| 6,035,120 A | * | 3/2000 | Ravichandran ............. 717/141 |
| 6,083,279 A | * | 7/2000 | Cuomo et al. .............. 717/118 |

* cited by examiner

Primary Examiner—Glenton B. Burgess
(74) Attorney, Agent, or Firm—Morrison & Foerster LLP

(57) ABSTRACT

A function is to be loaded from a first computer onto a second computer via a network, preferably a computer network or a communication network. To that end, the second computer, in addition to containing an operating system, also contains a platform-independent system, preferably a JAVA virtual machine, which assures that platform-independent code (JAVA byte code) can be run on this second computer by the operating system of the second computer. In addition to platform-independent code, platform-dependent code, specifically for the hardware of the second computer, can be loaded from the first computer, whereby the losses in running time resulting from platform-independent code are avoided. To that end, the first computer comprises the required platform-dependent functions, preferably as dynamic libraries that are potentially requested from the second computer, in order to achieve gains in running time on the second computer.

8 Claims, 3 Drawing Sheets

METHOD FOR LOADING A FUNCTION PROVIDED BY A FIRST COMPUTER (SERVER) ONTO A SECOND COMPUTER (CLIENT)

TECHNICAL FIELD OF THE INVENTION

The invention is directed to a method for loading a function offered by a first computer (server) onto a second computer (client), whereby the first computer and the second computer are connected via a network.

BACKGROUND OF THE INVENTION

A Network references a medium via which computers are connected to one another and via which messages are exchanged between the computers, whether connectionless or connection-oriented. Computer networks and communication networks are examples of such networks.

What Function refers to is a component that is required on a second computer and is made available on a first computer. Such functions can, for example, be programs that are to be loaded via the network from the first computer, procedures in the understanding of a structured programming language or methods in the object-oriented sense.

The programming language JAVA is notoriously known to a person skilled in the art. An important feature of JAVA is its independence from a specific platform (platform-independent). JAVA runs on every system on which a JAVA virtual machine is implemented. This JAVA virtual machine assumes the implementation of the JAVA program, whereby a controlled transmission with subsequent integrity check of the loaded code can ensue. A JAVA Applet refers to an application written in JAVA that is implemented on network browsers and, thus, runs on the JAVA virtual machine integrated in the network browser. In general, each JAVA Applet is also a JAVA Program.

Since, as mentioned, a JAVA virtual machine is needed for a runnable JAVA program (for example, a JAVA Applet), clear losses in running time must be accepted compared to a program (platform-dependent) specifically written for the respective computer. JAVA Byte code refers to a program code that can run platform-independently on every computer that has a JAVA virtual machine available to it. The JAVA byte code is integrated in JAVA Class Files that offer further information useful for the JAVA virtual machine, particularly containing a semantics for the environment of the JAVA virtual machine.

Accordingly, a distinction can be made between platform-dependent programs, i.e. programs specified for the respective computer, and platform-independent programs, i.e. programs runnable independently of the specific computer. The use of program code (also: Code) that utilizes specific hardware features of the respective computer is possible with a platform-dependent program. A significant gain in running time is thus involved in the program execution.

In existing systems that connect various computers to one another via platform-independent programs (for example, JAVA), it is disadvantageous that a platform-independent program produces clear losses in running time, by contrast whereby program code adapted to specific hardware, particularly multimedia hardware, would yield immense running time advantages.

SUMMARY OF THE INVENTION

The object of the invention is comprised in specifying a method for loading a function from one computer onto a second computer, whereby the aforementioned disadvantages are avoided.

This object is achieved according to the features of patent claim 1.

The inventive method enables the loading of a function offered by a first computer (server) onto a second computer (client), whereby the first computer and the second computer are connected via a network. To that end, the second computer inquires via the network at the first computer as to whether the function is available in a platform-dependent code. When a platform-dependent code is not available, a platform-independent code of the function is loaded from the first computer and the method is terminated. Otherwise (the platform-dependent code is available), a check is first carried out to see whether this platform-dependent code of the function is already present on the second computer and, when this is the case, this platform-dependent code is loaded and the method is terminated. When, by contrast, the platform-dependent code is not present on the second computer, then a decision is made on the basis of an input as to whether the platform-dependent code should be loaded from the first computer. When it derives from the input that the platform-dependent code should not be loaded, the platform-independent code is loaded and the method is terminated. When a decision is made on the basis of the input that the platform-dependent code should be loaded, then, following a negotiation between the first computer and the second computer, the platform dependent code of the function is loaded onto the second computer.

A development of the invention is comprised therein that the negotiation comprises the following steps:
the second computer requests a list of all available platform-dependent realizations of the function from the first computer. This list is transmitted from the first computer to the second computer. The second computer selects a suitable realization, informs the first computer of this, and requests a transmission of this realization of the function. It is thus assured that a suitable platform-dependent realization is transmitted to the second computer. Let it be noted that such a platform-dependent realization can, in particular, be a program produced for the respective platform or an object code compiled for the respective platform.

Another development is comprised therein that, following the loading of platform-dependent code from the first computer onto the second computer, a security check of this platform-dependent code is implemented This security check can thereby ensue in that an integrity check of this code ensues, preferably with a virus search program, before the loaded, platform-dependent code is implemented on the second computer.

In the framework of an additional development, it is possible to implement the input in one of the following ways:
a) a user indicates whether he wishes to load platform-dependent code from the first computer. The user can thereby make the decision and accept the risk of receiving corrupt code, i.e. faulty code or, for example, code affected by viruses, from the first computer.
B) the input ensues automated in that a list is maintained on the second computer that contains identifiers of computers that reside in a secure environment (trusted server).
C) the input is permanently set to "Load platform-dependent code" when the first computer contains no security-relevant data and/or programs. This is preferably the case given network computers specifically provided therefor. It is generally advantageous when the loaded functions are required only for the time-limited session, the second computer is turned off after the session and/or the data received via the network are not persistently stored.

Another development is that the platform-independent code is a matter of JAVA byte code that is integrated in JAVA class files.

BRIEF DESCRIPTION OF THE DRAWINGS

Developments of the invention also derive from the dependent claims.

Exemplary embodiments of the invention are presented in greater detail on the basis of the following figures.

Figure 1:
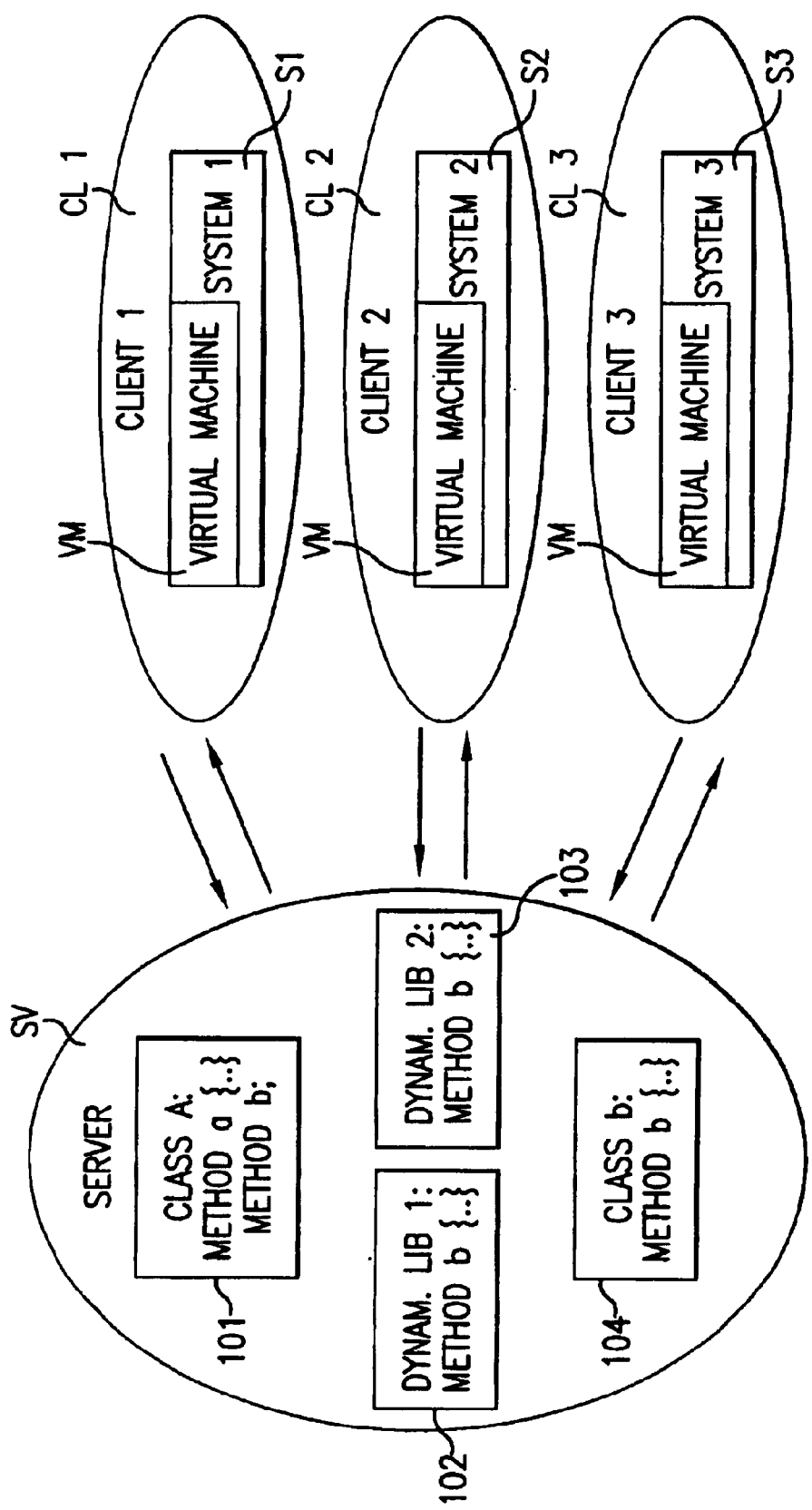
Figure 2:
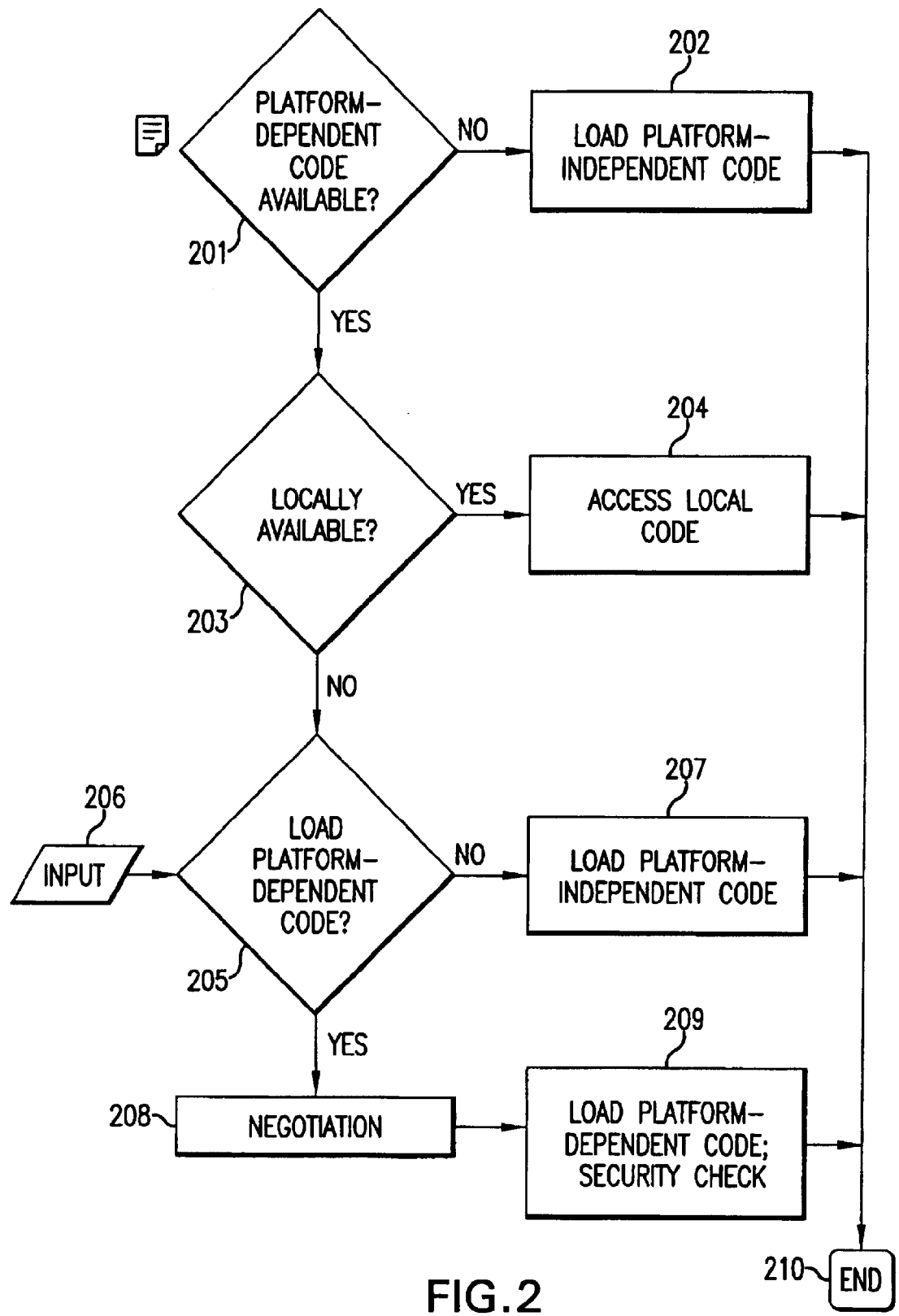
Figure 3:
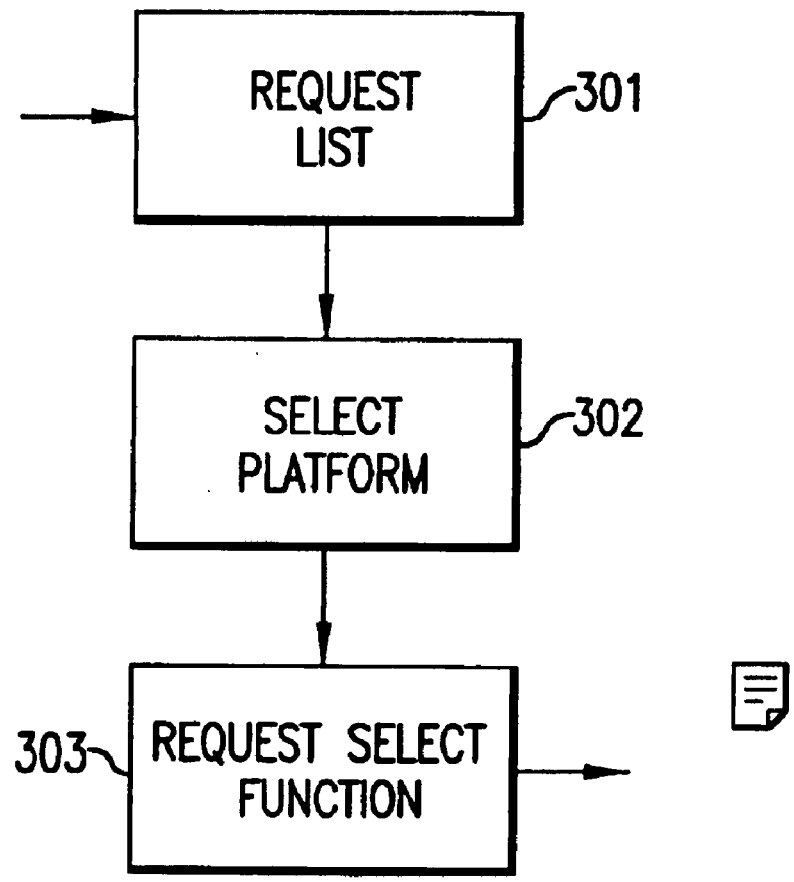

Shown are:

FIG. 1 a system of distributed computers with platform-dependent and platform-independent functions;

FIG. 2 a block diagram of a method for loading a function in platform-dependent or platform-independent code;

FIG. 3 a flow chart for a negotiation as to which realization of a function should be loaded in platform-dependent code.

DETAILED DESCRIPTION OF THE INVENTION

The configuration shown in FIG. 1 represents a client/server system.

The computers CL1, CL2 and CL3 (clients) want to execute an application on their virtual machine VM that is preferably written in JAVA. The three illustrated computers CL1, CL2 and CL3 respectively have different operating systems S1, S2 and S3 available to them, whereby a virtual machine VM runs on each of these operating systems, this in turn assuring that platform-independent JAVA class files that are intended for this virtual machine VM can be implemented on each of the computers CL1, CL2 and CL3. When the JAVA programs are a matter of JAVA Applets, then a network browser is active. A class A having a platform-independent implementation of a method a is contained on the server SV (see Block 101).

Let it be noted here that the term "method" is employed in the sense of object-oriented program, this referencing a procedure or function that is associated with a class and is called as reaction to a message. A message is thereby a request to an object to implement one of its methods. Farther-reaching definitions and explanations regarding object-oriented program with the terms preferred therein are adequately known to a person skilled in the art.

The implementation of the method a in platform-independent code, preferably,in JAVA byte code, and not in platform-dependent code means a platform-overlapping employment of the method a in all computers CL1, CL2 and CL3 with a corresponding virtual machine VM, whereby losses in running time must be accepted with employment of the virtual machine VM.

A second method b is merely declared within the class A 101; the method b is defined in three different ways outside the class A:

1. In the form of a platform-dependent library 102, that is defined for the operating system S1;
2.) As platform-dependent library 103, that is intended for the operating system S2;
3.) As platform-dependent method within a class b (see Block 104).

When the computer CL1 requests code for the method b, then it previously loads the class b and implements the comparatively stow byte code, even when the computer CL1 preferably has specific multimedia hardware available to it for the implementation of the functionality underlying the method b.

In order to make it possible to be able to use specific platform-dependent code optimized for running time in the respective computer (the computer CL1 here), the method b is declared as "native" in class A. The computer CL1 thus learns that the method b is also available in platform-dependent code on the server SV. The computer CL1 loads a platform-dependent representation of the method b from the server SV when this is specifically available for its platform, the operating system S1 (in the example of FIG. 1, this representation corresponds to (Block 102). The computer CL1 thus receives a version of the method b that is matched to the hardware of this computer CL1 and is less intensive in terms of running time. The computer CL1 preferably implements the method b in the JAVA environment via a predetermined interface JAVA-Native-Interface).

The inquiry of a computer CL1, CL2 or CL3 at the server SV as to whether a platform-dependent code is available on the server SV and whether this should also be potentially loaded onto the respective computer CL1, CL2 or CL3 is shown in detail in FIG. 2.

In a step 201, the computer CL1 inquires whether platform-dependent code is available on the server SV. When this is not the case, platform-independent code is loaded (see step 202 or, respectively, Block 194 in FIG. 1 for a platform-independent representation of the method b). When, by contrast, platform-dependent code is available on the server SV, then a determination is made in a step 203 as to whether the corresponding platform-dependent code is already locally available on the respective computer CL1. In such a case, the locally available code is accessed in a step 204. This can be assured, for example, by corresponding intermediate storage (cache memory).

When platform-dependent code is available on the server SV but is not locally available on the computer CL1, then a decision is made in a step 205 as to whether platform-dependent code should be loaded from the server SV onto the computer CL1.

An input 206 with which the user can determine whether he wishes to load platform-dependent code specifically from this server SV serves as decision aide. Another possible input is a list that contains identifiers of servers that are considered trustworthy (trusted servers). Platform-dependent code can be loaded from such servers without a security risk. A further possibility for an input is to always load platform-dependent code from a server. This strategy is particularly suitable when the computer CL1 is a pure network computer and/or contains no security-relevant data and/or programs.

When it is assumed that no platform-dependent code should be loaded from the server SV, due to the input 206, then platform-independent code is loaded in a step 207 (again see Block 104 in FIG. 1). When, by contrast, platform-dependent code is to be loaded, then a negotiation about the type of code to be loaded is implemented in a step 208 (also see the description of FIG. 3) and, in a step 209, the platform-dependent code is loaded. Platform-dependent code for the computer CL1 is indicated by the block 102 in FIG. 1.

Before the platform-dependent code is implemented on the computer CL1, a security check of this newly loaded code is preferably implemented d. This preferably occurs with specific programs that assure the integrity of the loaded code, preferably with a virus search program. The method terminates in a step 210.

As addressed in FIG. 2, the step 208 from FIG. 2 is explained in detail in FIG. 3.

The negotiation of the computer CL1 with the server SV ensues such that the computer CL1 requests a list of all available platform-dependent realizations of the method b from the server SV (see step 301). The list is transmitted from the server SV to the computer CL1. In a step 302, the computer CL1 selects a realization of the method b suitable for it's operating system S1, informs the server SV of this, and requests a transmission of the corresponding platform-dependent realization of the method b in a step 303 (see Block 102 in FIG. 1).

What is claimed is:

1. A method for loading a function offered by a first computer onto a second computer, the first computer and the second computer connected via a network, comprising:

inquiring at the first computer via the network as to whether the function is available in a platform-dependent code;

loading a platform-independent code of the function from the first computer and terminating the method when a platform-dependent code is not available; and when the platform-dependent code is available, performing the following:

carrying out a check to determine whether the platform-dependent code of the function is present on the second computer and, when the platform-dependent code of the function is present, the platform-dependent code is loaded and the method is terminated, and when the platform-dependent code is not present on the second computer, a decision is made based on an input as to whether the platform-dependent code should be loaded from the first computer, the decision comprising:

when a decision is made with the input that the platform-dependent code should not be loaded, the platform-independent code is loaded and the method is terminated, and when a decision is made with the input that the platform-dependent code should be loaded, then, following a negotiation between the first computer and the second computer, the platform-dependent code of the function is loaded onto the second computer.

2. The method according to claim 1, whereby the negotiation comprises:

requesting, via the second computer, a list of available platform-dependent realizations of the function from the first computer;

transmitting the list from the first computer to the second computer; and selecting, via the second computer, a suitable realization, which informs the first computer thereof, and requests a transmission of the realization of the function.

3. The method according to claim 2, whereby, following the selecting, loading the platform-dependent code from the first computer onto the second computer, a security check of the platform-dependent code is implemented.

4. The method according to claim 3, whereby the security check comprises:

before the loaded, platform-dependent code is implemented on the second computer, an integrity check of the code ensues.

5. The method according to claim 1, whereby the input comprises at least one of the following:

indicating whether a user wishes to load platform-dependent code from the first computer;

is performed on the basis of a list that comprises computers of a secure environment; and loading the platform-dependent code when the first computer includes no security-relevant data and/or programs.

6. The method according to claim 1, whereby the platform-independent code is JAVA byte code.

7. The method according to claim 4, wherein the integrity check of the code includes a virus search program.

8. A method for loading a function offered by a first computer onto a second computer, the first computer and the second computer connected via a network, comprising:

inquiring at the first computer via the network as to whether the function is available in a platform-dependent code;

loading a platform-independent code of the function from the first computer and terminating the method when a platform-dependent code is not available; and when the platform-dependent code is available, performing the following:

carrying out a check to determine whether the platform-dependent code of the function is present on the second computer and, when the platform-dependent code of the function is present, the platform-dependent code is loaded and the method is terminated, and when the platform-dependent code is not present on the second computer, a decision is made based on an input as to whether the platform-dependent code should be loaded from the first computer, the decision comprising:

when a decision is made with the input that the platform-dependent code should not be loaded, the platform-independent code is loaded and the method is terminated, and when a decision is made with the input that the platform-dependent code should be loaded, then, following a negotiation between the first computer and the second computer, the platform-dependent code of the function is loaded onto the second computer, whereby the negotiation comprises:

requesting, via the second computer, a list of available platform-dependent realizations of the function from the first computer;

transmitting the list from the first computer to the second computer; and selecting, via the second computer, a suitable realization, which informs the first computer thereof, and requests a transmission of the realization of the function.

* * * * *